(12) United States Patent
Unbedacht et al.

(10) Patent No.: US 9,092,119 B2
(45) Date of Patent: *Jul. 28, 2015

(54) REAL TIME PREVIEW

(75) Inventors: Kevin Unbedacht, Orem, UT (US);
Bruce Woodward, Orem, UT (US); Eric Johnson, Lindon, UT (US)

(73) Assignee: COREL SOFTWARE LLC, Wilmington, DE (US)

( * ) Notice: Subject to any disclaimer, the term of this patent is extended or adjusted under 35 U.S.C. 154(b) by 146 days.

This patent is subject to a terminal disclaimer.

(21) Appl. No.: 12/904,602

(22) Filed: Oct. 14, 2010

(65) Prior Publication Data

US 2011/0029916 A1    Feb. 3, 2011

Related U.S. Application Data (63) Continuation of application No. 10/752,048, filed on Jan. 6, 2004, now Pat. No. 7,827,483, which is a continuation of application No. 09/141,832, filed on Aug. 28, 1998, now Pat. No. 6,731,309.

(51) Int. Cl.
*G06F 3/048*     (2006.01)
*G06F 3/0484*    (2013.01)
(Continued)

(52) U.S. Cl.
CPC ............ *G06F 3/0484* (2013.01); *G06F 17/212* (2013.01); *G06F 17/24* (2013.01); *G06F 17/241* (2013.01); *G06F 17/245* (2013.01)

(58) Field of Classification Search
CPC ... G06F 17/212; G06F 17/24; G06F 17/0484; G06F 3/04842

USPC ................. 715/812, 861, 862, 711, 781, 250
See application file for complete search history.

(56) References Cited

U.S. PATENT DOCUMENTS

| | | |
|---|---|---|
| 4,464,730 A | 8/1984 | Lawrence |
| 4,495,490 A | 1/1985 | Hopper et al. |
| 4,513,391 A | 4/1985 | Maddock |

(Continued)

FOREIGN PATENT DOCUMENTS

| | | |
|---|---|---|
| EP | 0656580 A2 | 6/1995 |
| JP | 56155442 | 12/1981 |

(Continued)

OTHER PUBLICATIONS

PC Update Online!, the magazine of the Melbourne PC User Group, reprinted from the Jul. 1997 issue of PC update.*

(Continued)

*Primary Examiner* — Tadeese Hailu
(74) *Attorney, Agent, or Firm* — Pillsbury Winthrop Shaw Pittman LLP (57) ABSTRACT

Computer software applications presently allow the User to preview the impact of some commands on active documents via a small preview window. However, such preview windows are not representative of how the command will impact the entire document. The invention provides a method and system of efficiently and effectively previewing the impact of User commands on the entire document by executing User commands as they are identified. Leaving the menu open, the User is able to identify successive commands until the desired result is reached. Embodiments are described for execution of general commands, text editing commands, relocations of margins or guidelines, and relocations of graphic objects.

9 Claims, 6 Drawing Sheets

(51) Int. Cl.
*G06F 17/24* (2006.01)
*G06F 17/21* (2006.01)

(56) References Cited

U.S. PATENT DOCUMENTS

| | | | |
|---|---|---|---|
| 4,686,649 A | 8/1987 | Rush et al. |
| 4,692,858 A | 9/1987 | Redford et al. |
| 4,739,314 A | 4/1988 | McCaskill et al. |
| 4,739,477 A | 4/1988 | Barker |
| 4,899,136 A | 2/1990 | Beard et al. |
| 5,001,697 A | 3/1991 | Torres |
| 5,033,879 A | 7/1991 | Abe et al. |
| 5,062,060 A | 10/1991 | Kolnick |
| 5,121,497 A | 6/1992 | Kerr |
| 5,155,806 A | 10/1992 | Hoeber et al. |
| 5,157,763 A | 10/1992 | Peters |
| 5,220,649 A | 6/1993 | Forcier |
| 5,226,117 A | 7/1993 | Miklos |
| 5,243,697 A | 9/1993 | Hoeber |
| 5,276,795 A | 1/1994 | Hoeber et al. |
| 5,276,796 A | 1/1994 | Yamada et al. |
| 5,287,443 A | 2/1994 | Mameda |
| 5,299,303 A | 3/1994 | Fukunaga |
| 5,301,326 A | 4/1994 | Linnett et al. |
| 5,307,086 A | 4/1994 | Griffin et al. |
| 5,339,392 A | 8/1994 | Risberg |
| 5,359,708 A | 10/1994 | Bloomer et al. |
| 5,398,313 A | 3/1995 | Kojima |
| 5,414,809 A | 5/1995 | Hogan et al. |
| 5,425,138 A | 6/1995 | Kumakawa |
| 5,438,661 A | 8/1995 | Ogawa |
| 5,450,586 A | 9/1995 | Kuzara |
| 5,467,441 A | 11/1995 | Stone et al. |
| 5,467,448 A | 11/1995 | Hilton et al. |
| 5,469,540 A | 11/1995 | Powers, III |
| 5,479,601 A | 12/1995 | Matheny |
| 5,481,710 A | 1/1996 | Keane et al. |
| 5,500,931 A | 3/1996 | Sonnenschein |
| 5,513,309 A | 4/1996 | Meier et al. |
| 5,524,190 A | 6/1996 | Schaeffer |
| 5,528,742 A | 6/1996 | Moore |
| 5,530,864 A | 6/1996 | Matheny et al. |
| 5,546,527 A | 8/1996 | Fitzpatrick et al. |
| 5,548,700 A | 8/1996 | Bagley et al. |
| 5,551,055 A | 8/1996 | Matheny et al. |
| 5,552,982 A | 9/1996 | Jackson et al. |
| 5,559,945 A | 9/1996 | Beaudet et al. |
| 5,579,466 A | 11/1996 | Habib et al. |
| 5,586,242 A | 12/1996 | McQueen, III |
| 5,596,690 A | 1/1997 | Stone et al. |
| 5,598,522 A | 1/1997 | Inatomi |
| 5,600,778 A | 2/1997 | Swanson et al. |
| 5,604,853 A | 2/1997 | Nagashima |
| 5,633,957 A | 5/1997 | Robinson |
| 5,638,504 A | 6/1997 | Scott |
| 5,652,901 A | 7/1997 | Slayden |
| 5,659,747 A | 8/1997 | Nakajima |
| 5,668,964 A | 9/1997 | Helsel |
| 5,671,417 A * | 9/1997 | Miclette et al. ............... 717/130 |
| 5,680,629 A | 10/1997 | Slayden |
| 5,694,610 A | 12/1997 | Habib et al. |
| 5,715,417 A | 2/1998 | Gardien |
| 5,751,283 A | 5/1998 | Smith |
| 5,754,737 A | 5/1998 | Gipson |
| 5,760,776 A | 6/1998 | McGurrin |
| 5,778,402 A | 7/1998 | Gipson |
| 5,781,179 A | 7/1998 | Nakajima |
| 5,796,396 A | 8/1998 | Rich |
| 5,805,167 A | 9/1998 | van Cruyningen |
| 5,805,889 A | 9/1998 | Van de Vanter |
| 5,818,423 A | 10/1998 | Pugliese et al. |
| 5,828,376 A | 10/1998 | Solimene |
| 5,838,326 A | 11/1998 | Card et al. |
| 5,838,973 A | 11/1998 | Carpenter-Smith et al. |
| 5,860,073 A | 1/1999 | Ferrel et al. |
| 5,864,332 A | 1/1999 | Young |
| 5,870,088 A | 2/1999 | Washington et al. |
| 5,873,109 A | 2/1999 | High |
| 5,893,915 A | 4/1999 | Cordell et al. |
| 5,903,905 A | 5/1999 | Andersen et al. |
| 5,917,476 A | 6/1999 | Czerniecki |
| 5,937,417 A * | 8/1999 | Nielsen ...................... 715/207 |
| 5,953,735 A | 9/1999 | Forcier |
| 5,956,710 A * | 9/1999 | Yarom ...................... 1/1 |
| 5,960,448 A | 9/1999 | Reichek et al. |
| 5,990,906 A | 11/1999 | Hudson et al. |
| 6,006,242 A | 12/1999 | Poole et al. |
| 6,021,218 A | 2/2000 | Capps et al. |
| 6,025,841 A | 2/2000 | Finkelstein |
| 6,026,233 A | 2/2000 | Shulman et al. |
| 6,026,416 A | 2/2000 | Kanerva et al. |
| 6,043,817 A | 3/2000 | Bolnick et al. |
| 6,061,059 A * | 5/2000 | Taylor et al. ................. 715/764 |
| 6,078,936 A | 6/2000 | Martin et al. |
| 6,084,598 A | 7/2000 | Chekerylla |
| 6,111,667 A | 8/2000 | Mishima et al. |
| 6,118,444 A | 9/2000 | Garmon |
| 6,124,855 A | 9/2000 | Sells |
| 6,144,974 A | 11/2000 | Gartland |
| 6,167,455 A | 12/2000 | Friedman |
| 6,185,591 B1 | 2/2001 | Baker et al. |
| 6,240,430 B1 | 5/2001 | Deike et al. |
| 6,259,446 B1 | 7/2001 | Matheny et al. |
| 6,266,060 B1 | 7/2001 | Roth |
| 6,266,684 B1 | 7/2001 | Kraus |
| 6,275,225 B1 | 8/2001 | Rangarajan et al. |
| 6,285,461 B1 | 9/2001 | Fujii et al. |
| 6,285,464 B1 | 9/2001 | Fujii et al. |
| 6,301,586 B1 | 10/2001 | Yang et al. |
| 6,311,196 B1 | 10/2001 | Arora et al. |
| 6,324,554 B1 | 11/2001 | Watanabe |
| 6,330,577 B1 | 12/2001 | Kim |
| 6,348,936 B1 | 2/2002 | Berteig |
| 6,377,966 B1 | 4/2002 | Cooper et al. |
| 6,393,441 B1 | 5/2002 | Kanera et al. |
| 6,411,315 B1 | 6/2002 | Young |
| 6,470,363 B1 | 10/2002 | Kanera et al. |
| 6,480,206 B2 | 11/2002 | Prinzing |
| 6,483,797 B1 | 11/2002 | Oakley et al. |
| 6,507,858 B1 | 1/2003 | Kanera et al. |
| 6,515,682 B1 | 2/2003 | Washington et al. |
| 6,542,166 B1 | 4/2003 | Washington et al. |
| 6,586,797 B2 | 7/2003 | Forbes et al. |
| 6,606,101 B1 | 8/2003 | Malamud |
| RE38,270 E | 10/2003 | Nakajima |
| 6,680,749 B1 | 1/2004 | Anderson et al. |
| 6,727,919 B1 | 4/2004 | Reder et al. |
| 6,731,309 B1 | 5/2004 | Unbedacht et al. |
| 6,810,504 B2 | 10/2004 | Cooper et al. |
| 6,847,387 B2 | 1/2005 | Roth |
| 7,712,109 B2 | 5/2010 | Cirne |
| 2002/0154132 A1 | 10/2002 | Dumesny et al. |
| 2005/0071786 A1 | 3/2005 | Mariani |

FOREIGN PATENT DOCUMENTS

| | | |
|---|---|---|
| JP | 6309320 | 11/1994 |
| JP | 63273158 | 7/1996 |

OTHER PUBLICATIONS

Taylor, C., "What has WYSIWYG done to us?" 1996, 18 pgs; available at http://www.conradiator.com/downloads/pdfWhatHasWYSIWYG_done2us.pdf.

Walkenbach, J., "Excel for Dummies: Quick Reference," 1993, 8 pgs; available at http://media.mathewsbooks.com.s3.amazonaws.com/documents/tocwork/076/9780764539879.pdf.

Pimental, M.D.G.C., "Showing the destination of hypertext links: a new approach for Guide," Computing Laboratory, Univerisyt of Kent at Caterbury, U.K., SCE-ICMSC, Universidad de Sao Paulo, Brazil, May 1, 1992, 28 pgs; available at http://citeseerx.ist.psu.edu/viewdoc/summary?doi=10.1.1.29.4746.

(56) References Cited

OTHER PUBLICATIONS

Zimmerman, S., "A Chemist's View of WordPerfect for Windows," J. Chem. Inf. Comput. Sci., vol. 32, No. 5, 1992, pp. 563-566.

Fisher, A.J., "Incremental Algorithms for Interactive Text Formatting," J. Systems Software, vol. 16, 1991, pp. 3-16; available at http://www.sciencedirect.com/science/article/pii/0164121291900274.

Cote, J., "An Evaluation of Graphics Software," Journal of Marketing Research, vol. 28, No. 2, May 1991, pp. 253-256; retrieved from http://www.jstor.org/stable/3172818.

Weinstein, A. J., et al., "Introduction to Amiga TEX," Stanford Linear Accelerator Center, Stanford University, Stanford, California, SLAC-TN-91-1, Feb. 15, 1991, 43 pgs; available at: http://www.slac.stanford.edu/cgi-wrap/getdoc/slac-tn-91-001.pdf.

Raymond, R., "An Interactive Formatter for Tagged Text," 1990, Department of Computer Science, University of Waterloo, Waterloo, Canada, 25 pages, available at http://citeseerx.ist.psu.edu/viewdoc/summary?doi=10.1.1.70.8745.

Polly, L., "Word Processing in French on the Apple: An Addendum to a Postscript," The French Review, vol. 62, No. 1, Oct. 1988, pp. 178-182, published by American Association of Teachers of French; retrieved from http://www.jstor.org/stable/394926.

Textease Publisher CT-Video demo, available at http://www.youtube.com/watch?v=9MXeKabvlQk; uploaded in 2011.

Adobe Software, Press Release, published Aug. 25, 1998.

Extensis, Extensis Corporation Announces Availability of *PhotoFrame 1.0* for Adobe Photoshop, Feb. 17, 1998.

Textease Word Processor and Desktop Publisher for Acorn RISC OS3 User Guide, Softease Limited; 1995; 11 pgs.

Acorn Computing Special 1994; selected pages; 4 pgs.

IBM Technical Disclosure, "Pause Preview: A Technique for Improving the Interactivity of Direct Manipulation;" vol. 34, Issue No. 7A, Dec. 1, 1991.

IBM Technical Disclosure, "Outline Format Preview" vol. No. 25, Issue No. 12, p. 6486, May 1, 1983.

King, J. A., "Corel WordPerfect Suite 8 for Dummies," 1997, 24 pages, pp. 70-93, published by IDG Books Worldwide, Inc.

\* cited by examiner

REAL TIME PREVIEW

CROSS-REFERENCE TO RELATED APPLICATIONS

This application is a continuation of U.S. patent application Ser. No. 10/752,048, filed Jan. 6, 2004, now allowed, which is a continuation of U.S. patent application Ser. No. 09/141,832, filed Aug. 28, 1998, which issued as U.S. Pat. No. 6,731,309.

FIELD OF THE INVENTION

The present invention relates generally to the manner in which computer software applications execute User commands, and more specifically, to providing a preview of identified User commands.

BACKGROUND OF THE INVENTION

Most computer software application programs require interaction with the User in which the User may select commands from a variety of options. In document and graphic editing programs, for example, command options are available which alter the appearance of a User document. Generally, the process of executing commands consists of a User scanning through a large list of menu or toolbar options, often in a multi-level hierarchy, to select and then execute a desired command. The execution of the selected command usually consists of striking a <;Return>; key, an <;Enter>; key, clicking on an <;Okay>; icon, or responding positively to a query such as Confirm? (Y or N). The executed command then modifies the application document and closes the menu, and the User can see the impact of the command on the active document. If the User is not happy with the result, the menu options must be scanned again, and another command selected and executed. This process is slow and requires multiple keystrokes by the User, and may have to be repeated several times before the User obtains the desired result.

The same problems arise in text editing programs, graphic editing programs, and in software in general.

To expedite the process of command selection, there are a number of methods of previewing how a proposed change will impact a document. A technique common to text editing programs, is to provide a small dialogue window in a what-you-see-is-what-you-get (WYSIWYG) format. These windows provide the User with a small sample of how the change will impact the text in the document, and are commonly used, for example, for font face and size. There are two common implementations which are set out herein.

The first implementation is to execute the format code on a generic text listing, for example, the uppercase and lowercase letters of the alphabet, or a string such as "The quick brown fox jumps over the lazy dog." Although such an implementation presents text in the format being considered, it may not show the impact on the particular characters the User is using. As well, because the preview window only presents a small sample, there is no indication of how the change might impact an entire document.

The second implementation is to execute the format code on the first 20 or so characters of the selected text being modified. In this case, the text being modified comes from the User's actual text, so the preview window does provide the User with more information on how the change will affect the active document, but again, it is just a small sample. In the example of a font change, there is no indication of how the layout of the text in the document may be changed. Unexpected changes may occur such as text wrapping unexpectedly, or a graphic being pushed to an unwanted location in the active document. The User only finds out how the document is changed by executing the command, then closing the menu window and studying the document.

There are also a number of commands in text editors for which no preview is given at all. With preview limited to a small sample window, there is no point in providing the User with a preview of guideline or margin changes, for example. There is a need for such a preview as a User may wish to adjust the tab guidelines in a table so that the columns appear balanced, or change the margins so that the document does not exceed a certain number of pages.

Generally margins and guidelines are modified by the User grabbing them with a cursor, that is, by positioning a cursor over the margin or guideline and holding a mouse click button down, then relocating the margin or guideline to a new location and releasing the click button on the mouse. While the line is being relocated, an outline or shadow of the line appears in the document window, but the document itself is not updated until the mouse click is released, so there is no way to determine the impact on the document until the click is released.

Graphic editing programs are commonly used to prepare brochures, tables, schedules, flow charts, schematic diagrams, and many other such documents. Again, text preview windows are only appropriate for changes to the font size and type, so no preview is available for most other commands.

Some graphic editing programs provide the User with outlines or shadows of graphic figures as they are being moved or modified, but such outlines do not reflect the actual change to the document. The User must execute the change to see the complete impact.

Commands may be selected from toolbar menus, toolbar combo-boxes, toolbar grid-pickers and dialogue boxes, using a mouse, trackball, directional arrows, ALT keys or Function keys. As noted above, execution may be affected by striking a <;Return>; key, an <;Enter>; key, clicking on an <;Okay>; icon, or responding positively to a query such as Confirm? (Y or N).

There is therefore a need for a method of allowing a User to preview the impact of commands on an active document, or in general, to execute commands in an efficient and effective manner.

SUMMARY OF THE INVENTION

It is therefore an object of the invention to provide a method and system of efficiently and effectively previewing User commands. The method executes User commands on the active document as they are identified, providing the User with the actual impact of the command on the entire document in real time.

Accordingly, an aspect of the invention is broadly defined as a method of providing real time preview of commands in a computer system having means for displaying commands on a display screen, comprising the step of responding to one of the commands being identified by executing computer code corresponding to the identified command.

BRIEF DESCRIPTION OF THE DRAWINGS

These and other features of the invention will become more apparent from the following description in which reference is made to the appended drawings in which.

DETAILED DESCRIPTION

The invention is broadly defined as a method of providing real time preview of commands in a computer system having means for displaying commands on a display screen, comprising the step of responding to one of the commands being identified by executing computer code corresponding to the identified command. The primary distinction between this method and that of the prior art is that commands need only be identified by the User, and the identified command will be executed on the active document and the menu left open. Generally in the prior art, a command must be selected and then executed by the User, before the menu will be closed and the document will be updated.

Because the invention executes the identified command on the entire active document when it is identified, the User is able to see the full impact of the command on the document. Because the menu has been left open, the User has the option of selecting a new command which will replace the identified command, confirming that the identified command is desired, or cancelling the identified command.

Whether the menu should be left open or not depends on the nature of the command being issued. When selecting a font face for example, it is probably desirable to leave the menu open, while in executing a file save command, it probably is not desirable. Such a decision may be left to the programmer, who may allow the User the option in a Preference selection. Implementation of such options would be well known to one skilled in the art.

The software subroutines required to perform the method of the invention do not vary greatly from those subroutines known in the art. The order in which those subroutines are executed is important to the invention.

Such methods will now be described with respect to the general application and then with respect to several preferred embodiments. As well, additional options and advantageous implementations will also be described.

Figure 1A:
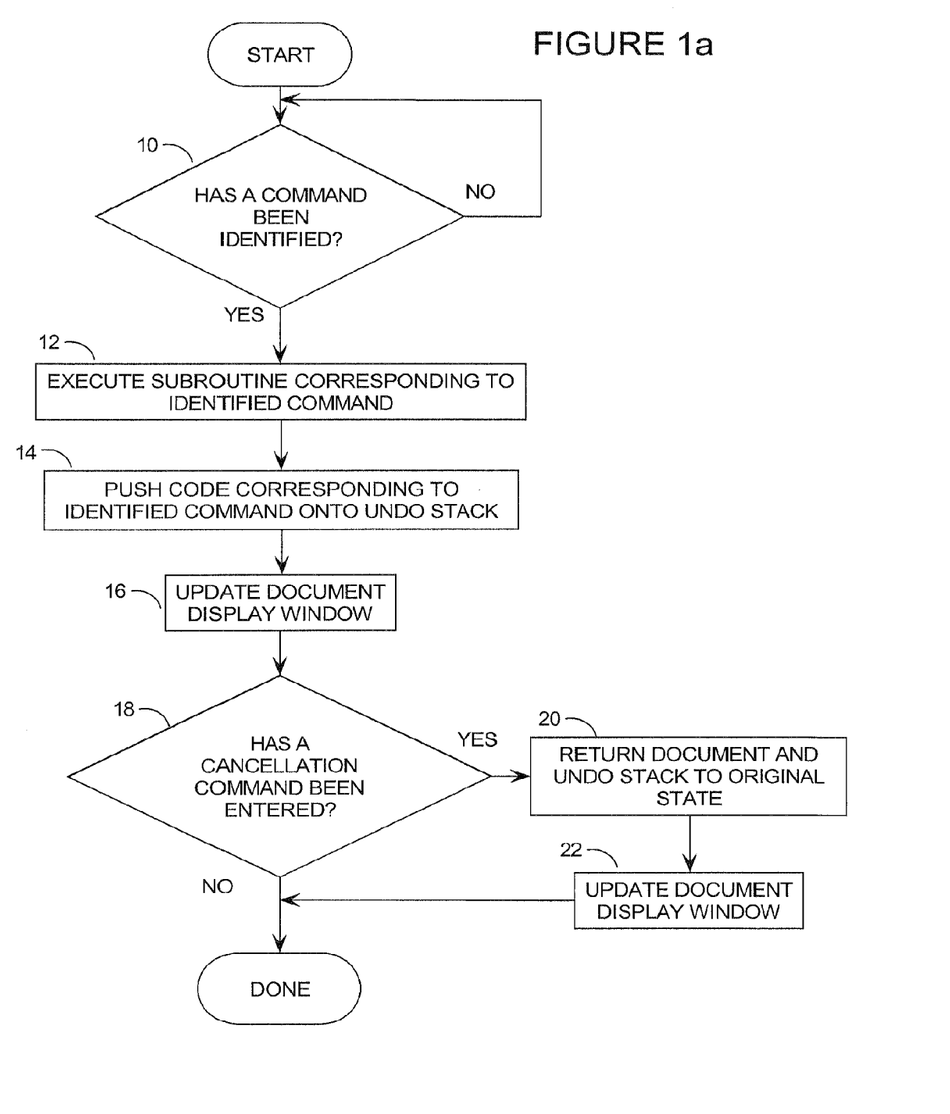
FIG. 1A presents a flow chart of a computer software routine for performing real time preview of commands in an embodiment of the invention, with a cancellation option.

FIG. 1A presents a flow chart of a computer software routine for performing real time preview of commands in an embodiment of the invention, with a cancellation option. This routine is generally being run as part of a larger application program, and is integrated into that application program. The details necessary to implement the invention in different operating system environments, requiring such steps as polling or accepting interrupt requests from a keyboard are not described herein. Such details would be known by one skilled in the art.

At step 10 the software application program notes that a menu or toolbar option has been identified. As described above, available commands may be presented and selected from menus and toolbars which may be set up as pull down menus, dropdown controls, toolbar combo-boxes, toolbar grid-pickers and dialogue boxes. Other implementations would also be known to one skilled in the art.

These commands may be identified by the User in a number of manners, including use of a mouse and cursor, trackball, character keys, identifying the location of a cursor, mouse, arrow keys, ALT+character commands, space bar location, voice commands, function keys or direction arrows on a keyboard. The identified command may be emphasized using reverse video or a colour which contrasts the background and other commands. Such implementations and the software routines used to handle User inputs would be known to one skilled in the art.

In an embodiment of the invention, it is envisioned that real time preview of a command be optional, so the identified menu or toolbar option must be enabled by the User to allow real time preview. This can be done in a number of ways, appropriate to the application or the programmer's preference. Preferably, commands for which real time preview is to be made available, will be selectable, either individually or in groups, within a User's preference window. This would give the User the option of disabling the real time preview feature if desired, and also to change the length of time required to execute certain options of the real time preview invention. More details are given regarding the timeout options in the following text.

Once a command has been identified, the application program executes the command at step 12. The manner in which this execution is realized would depend on the nature of the command and the application program, and would be known to one skilled in the art. In a word processor, for example, this execution would generally comprise inserting a code corresponding to the identified option into the memory medium storing the active document. In the case of a file save command, common to many software applications, this would comprise executing the appropriate software subroutine to effect storage of the active file.

After the identified command has been executed, it would generally be saved in an Undo Stack at step 14 so that the change can be undone if necessary.

The document display window is then updated or refreshed, at step 16, if changes have been made to the window and if updating is necessary. Some programs may automatically update the window when new code is added to it in which case updating does not appear as a discrete step in the program. Other programs may not require refreshing, if the change in command code does not cause the window to be cluttered with impertinent or spurious data. Some real time preview commands may not change the appearance of an open document, so of course, they would not require the display window to be updated either. Again, an example of this would be a file save command.

FIG. 1a has included an optional cancellation feature at step 18. At this point, the command has been executed, and the User has been advised of the result of the command execution. If the User wishes to cancel the command, it may be cancelled at this point by entering the appropriate instruction. Several commonly used cancellation commands are the <;Escape>; <;Backspace>; or <;Delete>; keys. Clearly any key could be used, though it is best to be consistent with common conventions.

If the User selects the cancellation command, the document and Undo Stack are returned to their original state at step 20, and the document window refreshed at step 22. The identified and executed command is simply removed from the Undo Stack and used to direct the program as to how the document is to be modified to return the document to its original state. Software routines to effect such operations are well known in the art.

With regard to step 22, as described above, the window may not require refreshing. Whether such a command is issued or not will depend on the implementation.

Figure 1B:
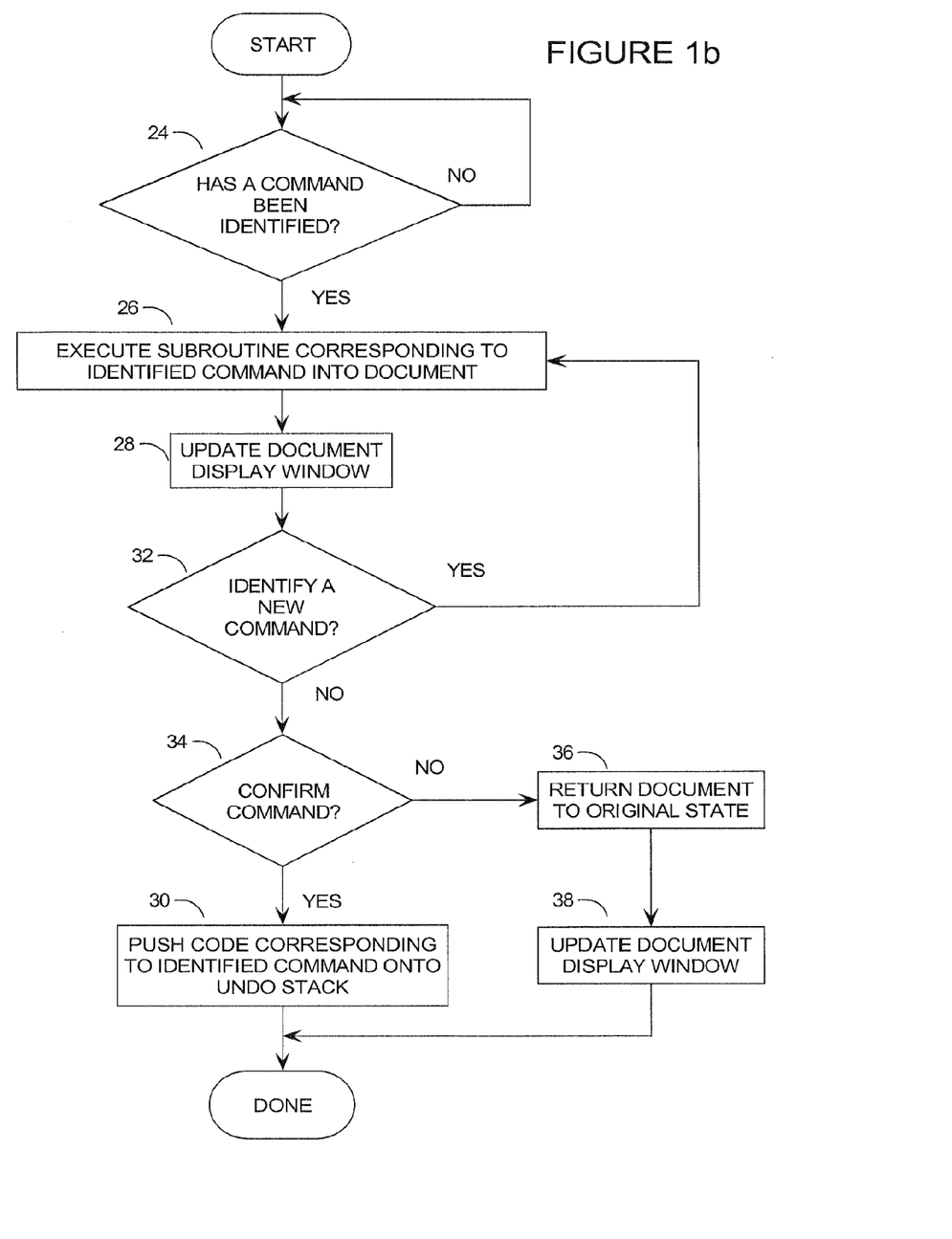
FIG. 1B presents a flow chart of a computer software routine for performing real time preview of commands in an embodiment of the invention, with a confirmation option.

FIG. 1b presents a flow chart of a computer software routine for performing real time preview of commands in an embodiment of the invention, with a "confirmation" option, rather than the "cancellation" option described with respect to steps 18, 20 and 22 of FIG. 1A. Either method may be used, though as described following, some applications are better suited to one or other of these two options. As well, FIG. 1B demonstrates in general terms how new commands may be identified and their impact viewed by the User without having to close and re-open the menu window.

In FIG. 1A it was noted that because the menu has been left open, the User has the option of either selecting a new command which will replace the current command, or cancelling the current command. In the embodiment of FIG. 1B, the User has the option of either selecting a new command or confirming the acceptability of the existing command.

The function blocks of the FIG. 1B method are very similar to those of FIG. 1A. Initially, a command is be identified by the User, as per step 24. This is done in the same manner as described with respect to step 10 above. Once the command is identified, the corresponding application subroutine is executed at step 26 and may introduce corresponding code to the active document. This step is done in the same manner as step 12 of FIG. 1A.

At this point, the method changes slightly from FIG. 1A. Because this routine requires a command to be confirmed, it does not presuppose that the identified command was desired as in FIG. 1A. Therefore, the document display window is updated at step 28, but preferably the corresponding code will not be pushed onto the Undo Stack until step 30, at which point the User has confirmed that this is the desired command.

Alternatively, the command code could be pushed onto the Undo Stack immediately following step 28. This would result in the Undo Stack containing unconfirmed commands which is generally not desirable. However, a User may prefer such an option, and it could be made available via a preferences selection.

If the User identifies a new command from the same menu window before confirming the previous command, at step 32, it may be executed in the same loop as steps 26 and 28. In some cases, further functionality will be required to remove existing code from the active document if it contains contrasting or contradicting information. Such codes are described as matching codes and will be described in greater detail with respect to the preferred embodiments.

Repeating this identification process and updating the document will allow the User to put the active document into the form desired and then confirm that the executed command is desired at step 34. Confirming the identified command allows it to be pushed onto the Undo Stack at step 30 and the routine is complete.

If the User is not satisfied with the impact of the identified command, the command is not confirmed at step 34, causing the document to be returned to the original state by executing an Undo operation at step 36, and updating the document display window at step 38. Such steps are well known in the art. At this point the routine is complete.

Either of the methods described with respect to FIG. 1A or 1b enable the User to see the complete impact of any commands on the active document, while leaving the current menu open. In this way the commands can be executed much more quickly and with fewer keystrokes than the methods known in the art.

Either of these methods may be easily implemented by one skilled in the art, because generally speaking, no new software routines are required. The method of the invention consists generally of the same routines as known in the art, but executed in a different order. The task of implementing the invention is therefore one of re-arranging existing routines to execute in the new order, and verifying and modifying if necessary the routines to maintain the coordination of variable declarations, assignments and calls.

This method may be applied to a large variety of implementations. Examples described below include text editors, margin or guidelines, and graphic editors. It would be clear to one skilled in the art however, how to apply the invention to other software applications, such as spreadsheets and database management programs.

The invention will now be described with respect to a text editor which may be incorporated into a word processing package, graphic editor, spreadsheet or other such software application.

Generally speaking, such a routine may be implemented on a computer system having means for operating a document editing program and means for storing an active document in a memory medium. Such an application may also generally have a means for displaying menu options in a menu or toolbar option list. The method itself comprises responding to one of the menu options in the menu or toolbar option list being identified by inserting code corresponding to the identified menu option into the memory medium storing the active document.

This is in contrast to the method of the prior art described above, in which commands must first be selected, then executed, at which time the menu is closed and the document updated. The invention therefore requires less time and fewer keystrokes to be entered by the User to see the resulting change on the active document.

Figure 2:
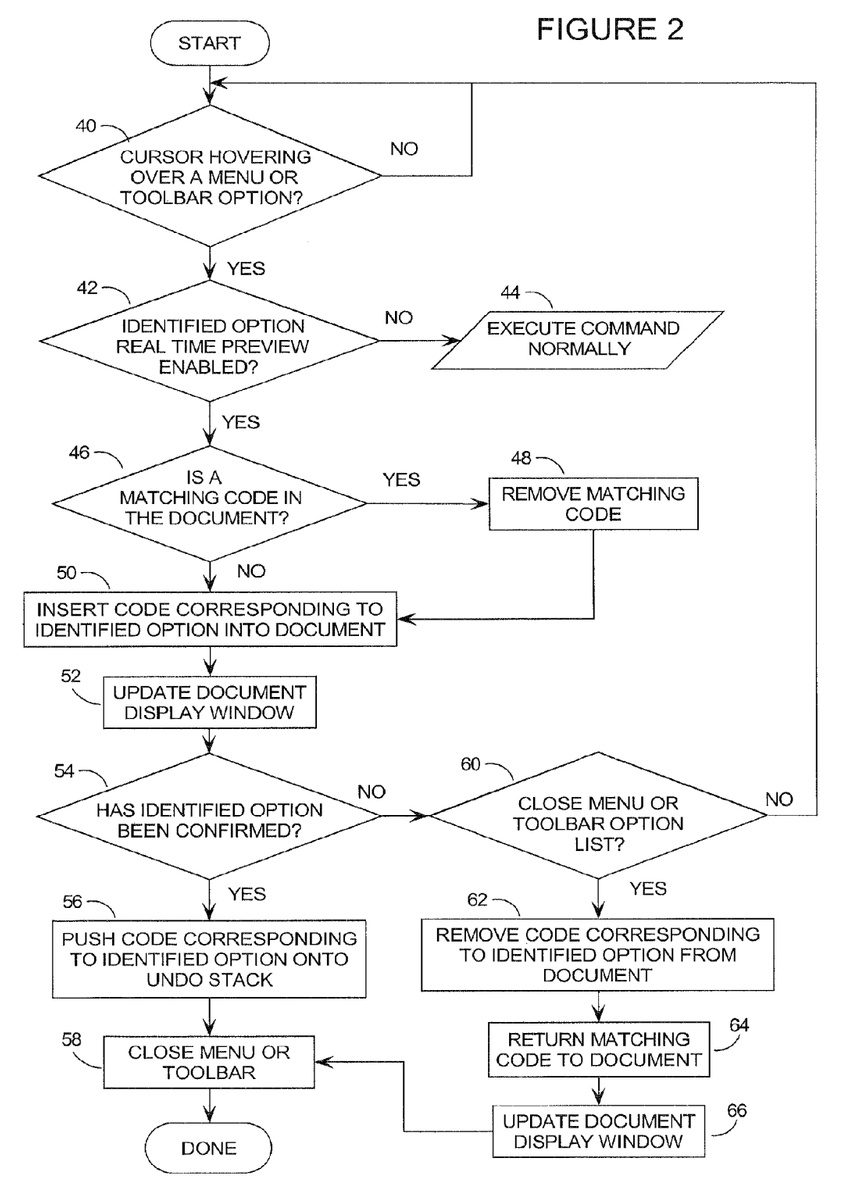
FIG. 2 presents a flow chart of a computer software routine for performing real time preview of text document commands in an embodiment of the invention.

FIG. 2 presents a flowchart of a computer software routine for performing such a real time preview of text editing commands in an embodiment of the invention. This method can typically be incorporated into a standard text editing application program, by altering the order of the existing software subroutines.

At step 40, a command is identified by a cursor hovering over a menu or toolbar option. As described above, commands may be presented by the application program in a number of manners including pull down menus and dialogue boxes. The User may select from the menus using a mouse, trackball, etc. Cursors are commonly controlled with mouses and software drivers incorporated into operating systems. Some software programs identify commands by inverting the video. The cursor being positioned above a command is generally described as hovering, and is used to identify commands.

Preferably, the identification of the command can be contingent upon the cursor hovering over the command for a predetermined period of time. This would allow the User to scan through a list of commands without each successive command being identified, and hence executed. The length of time required for this timeout could be established by the User in the Preferences of the Operating System, or in the Preferences of the particular application program. A single timeout could be used, or groups of commands could have different timeouts assigned by the User.

Until the User identifies a command, the routine remains at step 40. The flow chart is shown in this manner for simplification. One skilled in the art would be aware of the necessary interrupts, operating system calls or polling required to implement such a step.

Once a command has been identified, the software routine corresponding to the identified command is executed, and it checks whether the identified command is enabled for the real time preview at step 42. A straightforward implementation of such a feature would be to control operability of the real time preview in the Users Preferences, either in the application program or operating system preferences. These Preferences would then set a global Boolean flag as to whether real time preview is enabled or not, and each related command subroutine would check whether the flag is set or not. If the flag is not set to enable the real time preview for the identified command, then the program would continue to execute the command in the normal manner, shown as step 44 in FIG. 2.

Of course, the invention does require that such an enablement check be performed, and there are also many other ways in which such an enablement check could be implemented. The given implementation has the advantage of being easily implemented. It only requires a single additional line of code to the execution subroutine of each of the pertinent commands.

If the identified command is enabled for real time preview, the execution continues with step 46, which investigates whether there is a matching code already in the User document. A matching code is typically one which effects the same text block and in the same manner as the identified command, but yields a different appearance. Different font sizes, for example, would yield matching codes. If a selected block of text has a font size of 10, and the identified command is to change the font size of the same block of text to font size 12, then the routine will find the font size 10 matching codes, remove them at step 48 and insert the code for the font size 12 into the document at step 50.

If no matching code exists, the program continues directly to insert the code corresponding to the identified command at step 50. In general, commands which do not directly impact the appearance of a document will not have codes stored with a document, so no such matching codes will exist. File management commands such as Save, Open and Close are examples of such commands.

Also, application programs do not generally have a discrete mapping between commands and code to be inserted into the document. Rather a command will invoke a software subroutine that performs numerous tests and checks, and may ultimately result in code being added to the active document. The operation of such subroutines themselves is not the subject of this invention and are not included herein for simplicity. The implementation of such routine would be well known to one skilled in the art.

It is not the intent of the invention to alter how codes are stored in a document. The invention may be implemented in existing application programs by using the existing subroutines to insert code, identify matching codes and replace them. Such programs may also execute steps 48 and 50 in a different order, in less clearly defined steps, or by storing code in different parts of the active document. The User may have a default text font and font size stored in a document header, and only alter the code in part of the document. The manner in which a given application program would implement such steps would be known in the art.

At this point, the User document contains the code corresponding to the identified command. If the document display window requires updating to present a clear image to the User, it is done at step 52. As described above, whether such a step is required will depend on the application program. Generally, applications which require such refreshing or updating, will already contain the necessary subroutines to perform such operations.

In a preferred embodiment of the invention for text editing routines, it is intended that the User confirm or accept the identified command, shown as step 54. Such a query to the User may be provided as a dialogue box in a command window, or by similar means.

If the User confirms the identified command, then the program need only push the identified command unto the Undo Stack at step 56, which contains a listing of the executed commands in sequential order, and close the menu or toolbar at step 58. Again, implementation of such subroutines are known in the art and are generally already available in most application programs if they are required.

Some application programs do not allow the User to undo executed commands, so do not have an Undo Stack. Other programs which provide means for storing commands on an Undo Stack, or a similar means of storing executed commands allowing them to be undone, may only provide the Undo feature for certain commands. Clearly, implementation of step 56 is therefore at the discretion of the programmer.

Some menus and toolbars are always displayed to the User and clearly would not have to be closed per step 58.

If the User does not confirm the identified command at step 54, either the menu or toolbar may be closed, or a new command identified which returns the program to step 40. When the menu or toolbar is closed without confirming the identified command at step 60, the application returns the document to the state it was prior to the command being identified. Code corresponding to the identified command is removed from the active document at step 62, the matching code that was removed at step 48 is returned at step 64, and the document display window is updated at step 66. The menu or toolbar window can then be closed at step 58. The details and implementation of such steps are clear from the description of the complementary steps above.

It is preferred that the closing of the menu at step 60 be effected by the cursor being moved off the menu or toolbar option list, but clearly a selection window or similar means could also be provided. Depending on the application, the programmer may desire to have either the positive response to step 60 or step 54 effected by the cursor being moved off the menu or toolbar option list, or may wish to leave the option up to the User by means of a Preference selection.

In executing the method described above, it is preferred that the document editing program also provide means for displaying at least part of the active document in a document display window so that the impact of the changes may be viewed by the User. Provision of such a display means is well known in the art, as are the means for selecting menu options from a menu or toolbar option list, means for receiving a command to accept a previewed change, and means for tracking a cursor position. Such means are preferred, but not necessary to exploit the teachings of the invention.

Presently, it is envisioned that the invention be implemented on the following commands in a word processing package:

Column definitions
Drop position
Drop cap size
Drop cap type

Line spacing
Justification
Table text vertical alignment
Table text sorting
Table alternating fill mode
Text wrap around objects
Table position on page
Table diagonal lines
Font face
Font size
Quick font list
Image/table border styles
Image/table fill styles
Image/table line styles
Table skew mode
Image/table line width
Image/table line pattern
Drop shadow
Arrow end type
Text colour
Foreground/background colour for fills, patterns, drop shadow and lines
Top/bottom/left/right margins
First line indent
Hanging indent
Moving/sizing graphics.

This listing is not intended to outline the complete scope of the invention, but merely a listing of easily implemented and marketable features. Such features may not be common to all word processing packages. The invention may or may not be implemented with real time preview on the following options:
Outline/bullets mode
Styles
Zoom mode.

The decision of whether to apply the invention to certain functions is largely a trade-off of speed versus utility. The User may not appreciate the added utility of real time preview of a feature if it takes too long to execute. As the speed of software and hardware increases, the real time to execute will decrease. Once the hardware and software execute at a sufficient speed, all functions may be implemented in a real time preview mode with no perceivable execution delay. This would also allow the time-out on the hover of the cursor to be removed, because even in scanning through a list of options, the program could display them all with no delay to the User.

In this manner, the invention offers the User the ability to survey a variety of command options and see the impact of those changes on the entire active document in real time. This is done much more quickly than the methods known in the prior art, and with fewer keystrokes.

The method of the invention will now be described with respect to the implementation of margins or guidelines in a document editing program. Such a routine may generally be implemented on a computer system having means for operating a document editing program, means for displaying at least part of an active document in a display window and means for storing said active document in a memory medium. Such an application will preferably have means for displaying document guidelines or margins. The method itself comprises responding to one of the guidelines or margins being grabbed and relocated from a first location to a second location by inserting code corresponding to the guideline or margin at the second location into the memory medium storing the active document; and removing code corresponding to the guideline or margin at the first location from the memory medium storing the active document.

This is in contrast to the method of the prior art, in which only a shadow of the guideline or margin in the new location is given, and the document is not altered until the guideline or margin is released. The invention therefore requires less time and fewer steps to see the resulting change on the active document.

Figure 3A:
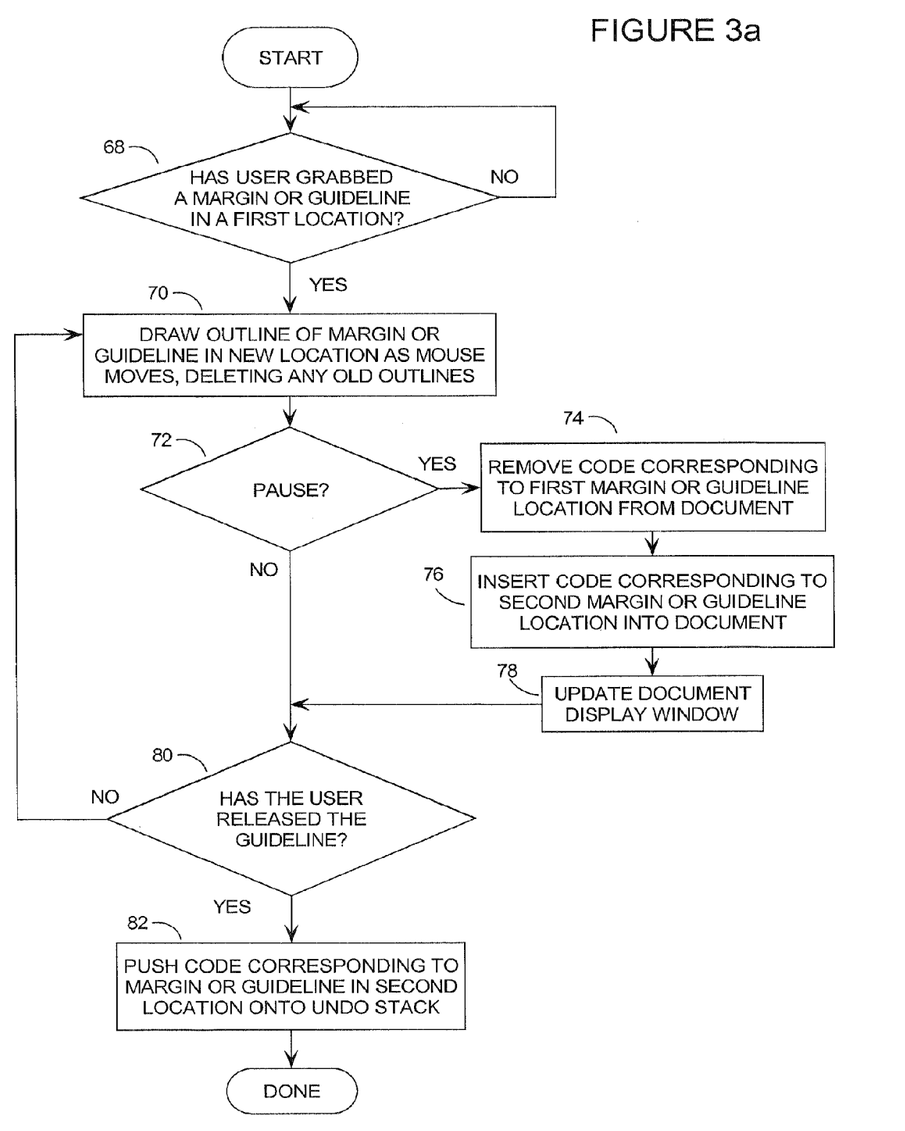
FIG. 3A presents a flow chart of a computer software routine for performing real time preview of margin or guideline commands in an embodiment of the invention.

FIG. 3A presents a flowchart of a computer software routine for performing such a real time preview of guideline or margin relocations in an embodiment of the invention. This method can typically be incorporated into a standard text editing application program by altering the order of the existing software subroutines.

At step 68, a guideline or margin is grabbed by the User double-clicking or clicking and holding, with a mouse cursor hovering over a menu or toolbar option. Other ways as known in the art may also be used, in one of the manners described above, or by identifying the margin or guideline in a ruler bar.

Until the User identifies a margin or guideline, the routine remains at step 68. Again, the routine is shown in this manner for simplification and one skilled in the art would be aware of the necessary interrupts, operating system calls or polling required to implement such a step.

As well, the enablement of this feature may be controlled by the User preferences in the manner described with respect to step 42 above. If the feature is not enabled, margins and guidelines may be implemented in the manner normally performed by the application program.

Once a margin or guideline has been grabbed, the software routine follows directional commands input by the User to relocate the grabbed margin or guideline at step 70. Such directional commands are well known in the art, and may include following the mouse or trackball cursor, or use of the directional arrows on the keyboard. The invention does not dependent on how the relocation is tracked.

As the relocation of the margin or guideline is tracked, an outline or shadow of the margin or guideline may be drawn in the new location and old outlines removed, so that the User is aware of the current position. If the User holds the cursor in a given position or pauses for a predetermined period of time at step 72, then the routine will consider the current location to be the new location of the margin or guideline and execute steps 74, 76 and 78. Other wise, the routine will understand that the grabbed margin or guideline is not in its final location and continue on to step 80.

The timeout of the cursor in a given position for a predetermined period of time may be implemented as described above, with the period of time set within the User's Preferences. However, if the computer hardware and software are sufficiently powerful this time period may be made so short that the document appears to update continuously as the margin or guideline is moved.

With the timeout at step 72, the routine removes any matching code in the memory medium storing the active document at step 74. In this case, the matching will generally be the code corresponding to the margin or guideline in the initial, or first location. Code is then inserted into the active document representing the margin or guideline in the current, or second location at step 76. Steps 74 and 76 need not be executed in this order, or in such clearly distinguishable steps, to effect the invention.

At this point, the User document contains the code corresponding to the identified command. If the document display window requires updating to present a clear image to the User, it is done at step 78. As described above, whether such a step is required will depend on the application program.

Generally, applications which require such refreshing or updating, will already contain the necessary subroutines to perform such operations.

When the User releases the guideline or margin at step 80, the guideline or margin is left in the current position and the corresponding code is pushed onto the Undo Stack at step 82. If the document was not updated for a new margin or guideline location via steps 74, 76 and 78, then preferably the routine will recognize that no change was made to the document and not push the redundant code onto the Undo Stack. If the User does not release the margin or guideline at step 80, then the routine will return to step 70 and continue to track the location of the margin or guideline with the Users directional inputs.

Figure 3B:
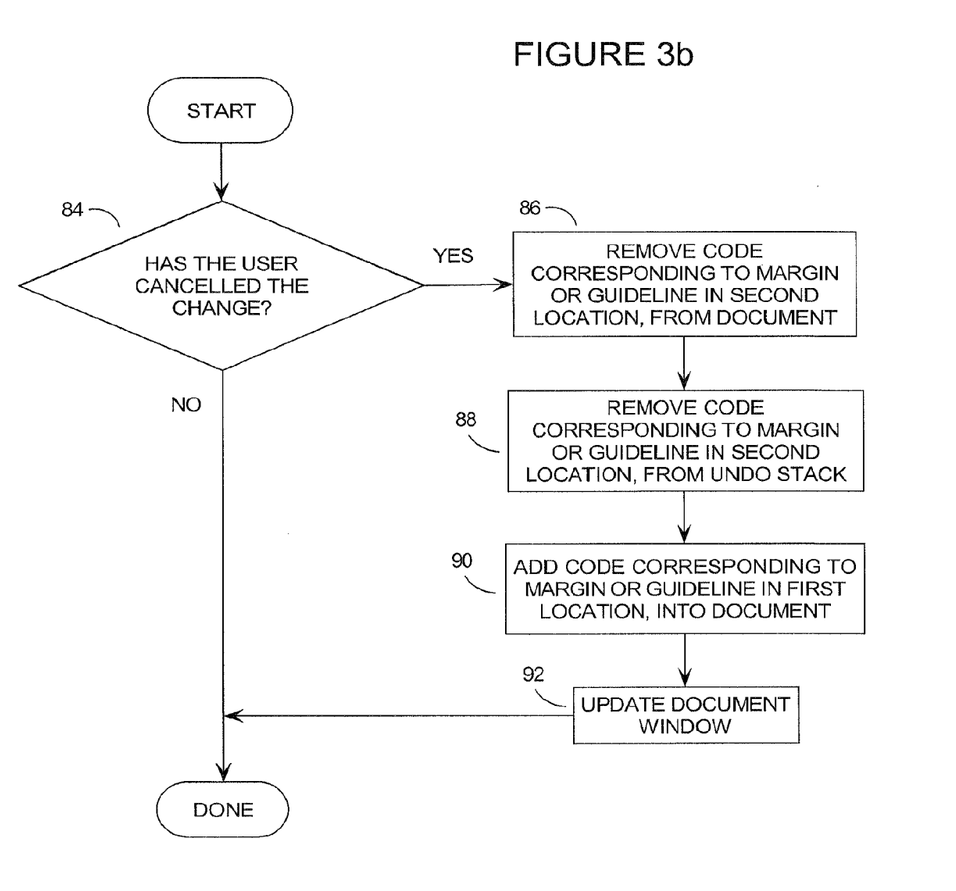
FIG. 3B presents a flow chart of a computer software routine for cancelling previewed margin or guideline commands in an embodiment of the invention.

FIG. 3B provides an optional routine for cancelling changes to margin or guideline locations in an embodiment of the invention. If the User wishes to cancel a margin or guideline relocation the appropriate cancellation key may be entered at step 84, such as the <;Escape>; <;Backspace>; or <;Delete>; keys. As noted above, any key could be used, though it is best to be consistent with common conventions.

If this cancellation is made, then the routine removes the code from the active document corresponding to the guideline or margin in the second, or current location at step 86. The same code is also removed from the Undo Stack at step 88, if it has been stored there. The routine may now replace the margin or guideline code with the original matching code, returning the margin or guideline to the first location at step 90. The document display window may now be updated or refreshed if necessary, at step 92.

As with the embodiments of the invention described above, the implementation described with respect to FIGS. 3A and 3B in general does not require new software subroutines to be created. The invention relies generally on the same functional subroutines as those existing in the art, but alters the order so that the User may obtain the desired modifications more quickly than with the known methods. Additional code is generally only required to add the new queries and to execute the existing routines accordingly.

In executing the method described above, it is preferred that the document editing program also provide means for tracking a cursor position, means for displaying margin or tab guidelines and means for providing an Undo Stack. Such means are preferred, but not necessary to exploit the teachings of the invention.

In this manner, the invention allows the User to relocate margins and guidelines to obtained the desired result much more quickly than known in the art. The invention allows the User to preview the impact of new locations on the active document without releasing the margin or guideline as required by the prior art.

The method of the invention will now be described with respect to the relocation of graphic images in a graphic editing program. Such a routine may generally be implemented on a computer system having means for operating a graphic editing program, means for displaying at least part of an active graphic document in a display window and means for storing said active graphic document in a memory medium. Such a method will also preferably have means for relocating graphic objects in said active graphic document. The method itself comprises responding to one of the graphic objects being grabbed and relocated from a first location to a second location by inserting code corresponding to the graphic object at the second location into the memory medium storing the active graphic document and removing code corresponding to the graphic object at the first location from the memory medium storing the active graphic document.

This is in contrast to the method of the prior art, in which only a shadow of the graphic object in the new location is displayed, and the document is not altered until the graphic object is released. The invention therefore requires less time and fewer steps to see the resulting change to the active document.

Figure 4:
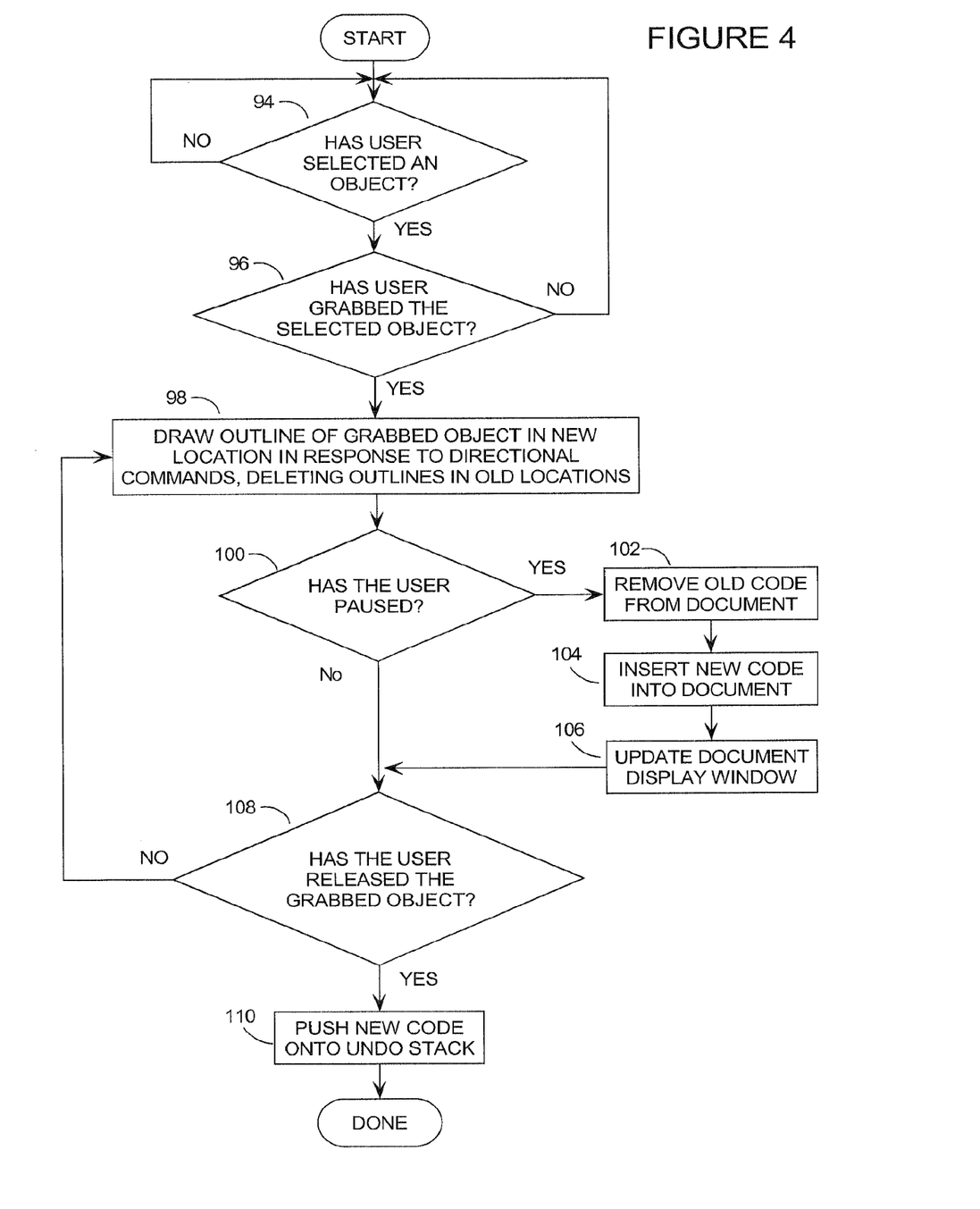
FIG. 4 presents a flow chart of a computer software routine for performing real time preview of object movements in an embodiment of the invention.

FIG. 4 presents a flowchart of a computer software routine for performing such a real time preview of graphic object relocations in an embodiment of the invention. This method can typically be incorporated into a standard graphic editing application program by altering the order of the existing software subroutines, with minimal changes to the existing code.

At step 94, a graphic object is selected in a manner known in art, such as by single-clicking with a mouse cursor hovering over the object. The selected graphic object may then be grabbed at step 96 by clicking and holding, again with the mouse cursor hovering over the graphic object. There are also other means for grabbing graphic objects as known in the art.

Until the User selects and grabs a graphic object, the routine remains at steps 94 or 96. Again, the routine is shown in this manner for simplification and one skilled in the art would be aware of the necessary interrupts, operating system calls or polling required to implement such steps.

As well, the enablement of this feature may be controlled by the User preferences in the manner described with respect to step 42 above. If the feature is not enabled, relocation of graphic objects may be implemented in the manner normally performed by the application program.

Once a graphic object has been grabbed, the software routine follows directional commands input by the User to relocate the grabbed margin or guideline at step 98. Such directional commands are well known in the art, and may include following the mouse or trackball cursor, or use of the directional arrows on the keyboard. The essence of the invention is independent of the manner in which the relocation is followed.

Preferably, as the relocation of the graphic object is tracked, an outline or shadow of the graphic object may be drawn in the new location and old outlines removed, so that the User is aware of the current position. If the User holds the cursor in a given position or pauses for a predetermined period of time at step 100, then the routine will consider the current location to be the new location of the graphic object and execute steps 102, 104 and 106. Other wise, the routine will understand that the grabbed graphic object is not in its final location and continue on to step 108.

The timeout of the cursor in a given position for a predetermined period of time may be implemented as described above, with the period of time set by the User's Preferences. However, if the computer hardware and software are sufficiently powerful this time period may be made so short that the document appears to update continuously as the graphic object is moved.

With the timeout at step 100, the routine removes the matching code representing the graphic object in the first or original location, from the memory medium storing the active document at step 102. Code is then inserted into the active document representing the graphic object in the current, or second location at step 104. Steps 102 and 104 need not be executed in this order, or in such clearly distinguishable steps, to effect the invention.

At this point, the User document contains the code corresponding to the graphic object in the relocated position. If the document display window requires updating to present a clear image to the User, it is done at step 106. As described above, whether such a step is required will depend on the application program.

When the User releases the graphic object at step 108, the graphic object is left in the current position and the corresponding code is pushed onto the Undo Stack at step 110. If the document was not updated for a new graphic object location via steps 102, 104 and 106, then preferably the routine will recognize that no change was made to the document and not push the redundant code onto the Undo Stack. If the User does not release the graphic object at step 108, then the routine will return to step 98 and continue to track the location of the graphic object with the User's directional inputs.

This routine could be implemented with cancellation or confirmation options as described with respect to FIG. 2 or 3B. In the preferred embodiment of the invention, neither option was deemed to be necessary.

As with the other embodiments of the invention described above, the implementation described with respect to FIG. 4 in general does not require new software subroutines to be created. The invention relies generally on the same functional subroutines as those existing in the art, but alters the order so that the User may obtain the desired modifications more quickly than with the known methods. Additional code is generally only required to add the new queries and to execute the existing routines accordingly.

In executing the method described above, it is preferred that the document graphic program also provide means for means for tracking a cursor position, means for relocating graphic objects in said active graphic document and means for providing an Undo Stack. Such means are preferred, but not necessary to exploit the teachings of the invention.

In this manner, the invention allows the User to relocate graphic objects to obtain the desired result much more quickly than known in the art. The invention allows the User to preview the impact of new locations on the active document without releasing the grabbed graphic object as required by the prior art.

While particular embodiments of the present invention have been shown and described, it is clear that changes and modifications may be made to such embodiments without departing from the true scope and spirit of the invention. For example, the order of many of the method steps could re-arranged, provided that the re-arrangement does not change the impact of the steps. Such changes would still realize the benefits of the invention.

Other steps may not be literally executed, but be inherent in the execution of the program. For example, some programs may automatically refresh when changes are made to a document, so there is no need to literally execute such commands.

The method steps of the invention may be incorporated into a hardware system which combines different hardware and software components to realize the benefit of the invention. The methods steps of the invention may also be stored in various forms of computer-readable memory or articles of manufacture storing the instructions or statements for use in the execution of the process, such as computer diskettes, CD-ROMs, hard drives or tapes. Further, computer code representing the method steps of the invention may be transmitted via computer and telecommunication networks as electrical signals.

It is also expected that the continuing improvement in electronic technology will change the execution of the invention. As noted above, it is currently preferred to use an adjustable timeout to effect the previewed changes. Current technology requires such a timeout to prevent the software from trying to continuously update a document as the cursor moves along. A computer which is able to update at a sufficiently high speed will be able to update a document continuously without the User noticing any burden to the computer. Such a system would not require a timeout.

A computer method in the manner of the invention could be applied to a broad range of software applications. One skilled in the art could easily apply the teachings of this invention to such applications as the essence of the invention lies in the sequence in which the steps are executed. The above-described embodiments of the present invention are intended to be examples only. Alterations, modifications and variations may be effected to the particular embodiments by those of skill in the art without departing from the scope of the invention, which is defined solely by the claims appended hereto.

What is claimed is:

1. A method comprising:
a) displaying a predetermined portion of an application in execution upon a processor within an application display window to a user, the predetermined portion of the application containing a menu or toolbar option;
b) tracking a cursor location within the application display window controlled by the user;
c) identifying a first function within the menu or toolbar option by the location being within a predetermined range for a predetermined period of time over a position within the application display window associated with the first function;
d) automatically inserting code relating to the first function into a first memory medium storing code for subsequent execution by the processor in relation to the application;
e) automatically executing the code relating to the first function; and
f) updating the application display window in response to the execution of the code relating to the first function.

2. The method according to claim 1 further comprising;
pushing the code relating to the first function to an undo stack when the first function selected is capable of being reversed.

3. The method according to claim 1 further comprising;
reversing steps (d), (e) and (f) absent at least one of the user subsequently confirming the first function and identifying a second function selection of the user.

4. The method according to claim 1 wherein,
step (a) further comprises displaying within the application display window a predetermined portion of content selected by the user and retrieved with the application; and
step (d) further comprises storing data associated with the first function within a second memory medium in association with the content retrieved.

5. The method according to claim 4 further comprising;
g) storing first data associated with the first function within a second memory medium in association with the content retrieved further comprises pushing second data relating to the first function within the second memory medium associated with the content retrieved to the undo stack.

6. The method according to claim 5 further comprising;
reversing step (g) absent at least one of the user subsequently confirming the first function and identifying a second function selection by the user.

7. The method according to claim 1 wherein, the application comprises at least one of a word processor, a spreadsheet application, a graphics application, an audiovisual application, an operating system, a security application, a data compression application, and a process analysis application.

8. The method according to claim 1 wherein, step (b) comprises the user using at least one of a haptic interface, a computer peripheral and a sensor.

9. The method according to claim 1 wherein, at least one of the predetermined range and predetermined duration are determined in dependence upon at least one of the application, the menu or toolbar option, and an aspect of content selected by the user and retrieved with the application.

* * * * *